United States Patent
Gould et al.

(10) Patent No.: US 6,473,655 B1
(45) Date of Patent: Oct. 29, 2002

(54) DATA PROCESSING SYSTEM AND METHOD FOR CREATING A VIRTUAL PARTITION WITHIN AN EXISTING PARTITION IN A HARD DISK DRIVE

(75) Inventors: Christopher Britton Gould, Raleigh; David Rhoades, Apex; Walter Leslie Robinson, Raleigh; Gary Anthony Vaiskauckas, Morrisville, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/562,535

(22) Filed: May 2, 2000

(51) Int. Cl.$^7$ .............................................. G05B 19/18
(52) U.S. Cl. .................. 700/5; 700/2; 700/4; 709/104; 709/222; 711/163; 711/173; 711/112; 714/5; 714/10; 714/36
(58) Field of Search .............................. 700/1, 2, 3, 4, 700/5; 709/104, 222; 710/200; 711/163, 173, 115, 112; 713/188, 189, 1–2, 100, 193, 200–202; 714/10, 36, 5

(56) References Cited

U.S. PATENT DOCUMENTS

| | | | |
|---|---|---|---|
| 5,142,680 A | | 8/1992 | Ottman et al. ............... 717/176 |
| 5,434,994 A | | 7/1995 | Shaheen et al. ............ 709/223 |
| 5,680,303 A | * | 10/1997 | Libucha et al. ............. 180/167 |
| 5,706,472 A | * | 1/1998 | Ruff et al. ................... 711/112 |
| 5,721,858 A | * | 2/1998 | White et al. ................ 711/200 |
| 5,758,165 A | * | 5/1998 | Shuff ............................. 713/2 |
| 5,790,848 A | | 8/1998 | Wlaschin .................... 707/201 |
| 5,842,226 A | * | 11/1998 | Barton et al. ............... 711/153 |
| 5,850,522 A | | 12/1998 | Wlaschin .................... 709/215 |
| 5,887,164 A | * | 3/1999 | Gupta ......................... 709/222 |
| 5,907,672 A | * | 5/1999 | Matze et al. ................ 711/162 |
| 5,930,831 A | | 7/1999 | Marsh et al. ................ 711/173 |
| 6,094,720 A | * | 7/2000 | Cromer et al. .................. 713/1 |
| 6,282,642 B1 | * | 8/2001 | Cromer et al. .................. 713/1 |
| 6,330,653 B1 | * | 12/2001 | Murray et al. .............. 711/112 |
| 6,351,850 B1 | * | 2/2002 | van Gilluwe et al. ....... 707/203 |

* cited by examiner

Primary Examiner—Ramesh Patel
(74) Attorney, Agent, or Firm—Andrew J. Dillon

(57) ABSTRACT

A data processing system and method are described for creating a virtual partition within an existing partition within a hard disk drive included within the system. A first master boot record is written which includes a partition. The partition defines a first file system to be utilized by the hard drive. A file is created within the partition. The first master boot record is temporarily overwritten with a second master boot record without altering the first file system. The second master boot record includes a designation of the file as a second partition. The second partition defines a second file system. The second partition is designated as the active partition. The data processing system is booted utilizing the second master boot record. The second partition is a virtual partition within the existing partition.

21 Claims, 5 Drawing Sheets

DATA PROCESSING SYSTEM AND METHOD FOR CREATING A VIRTUAL PARTITION WITHIN AN EXISTING PARTITION IN A HARD DISK DRIVE

BACKGROUND OF THE INVENTION

1. Field of the Invention

The present invention relates in general to data processing systems and, in particular, to a data processing system and method including a hard disk drive partitioned to store a native operating system within an existing partition. Still more particularly, the present invention relates to a data processing system and method including a hard disk drive partitioned to store a native operating system within an existing partition for creating a virtual partition within the existing partition, where a second operating system may be stored in the virtual partition.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

In personal computer systems there are numerous low-level devices which contain firmware which may require updating after they have already been installed in a customer's enterprise. Examples of such firmware include the FLASH BIOS, SCSI devices, IDE devices, RAID adapters, and system management adapters.

Currently, in order to update this firmware, a floppy disk is inserted into the system. The floppy disk is typically a DOS based boot disk including the update to the firmware. This is a rather laborious task because many of the systems including firmware which need to be updated may be miles apart.

If the computer systems are coupled together in a network, a server computer system could manage the updates remotely with appropriate scheduling. However, this remote maintenance solution is difficult to accomplish. Each computer system coupled to a network could be executing different operating systems. Each computer system should be permitted to keep running its native operating system with minimal interruption to its availability to users during the updating of the computer's firmware.

In order to be able to update a client computer system remotely from a server, an update for each hardware type must be designed and coded. This requires a significant amount of designing, coding, and testing for each update for each possible operating system. For example, if six different hardware types need to be updated on client computer system running six different operating systems, thirty-six updates must be designed, coded, and tested.

A personal computer system includes a hard disk drive. FIG. 1 depicts a disk drive 12 and a disk 10 in accordance with the prior art. Disk 10 illustrates physical characteristics of both floppy and hard disks. Disk 10 includes a number of concentric data cylinders such as cylinder 14. Cylinder 14 includes several data sectors, such as sectors 16 and 18. Sectors 16 and 18 are located on an upper side 20 of disk 10. Additional sectors may be located on a lower side 22 of disk 10. Sides 20 and 22 of disk 10 define a platter 24. A hard disk may contain several platters. Upper side 20 of disk 10 is accessed by a head 26 mounted on an arm 28 secured to drive 12. A given sector on disk 10 may be identified by specifying a head, a cylinder, and a sector within the cylinder.

In a personal computer system, the hard disk drive may be divided into separate partitions. A different partition is required for each operating system stored on the drive. A different file system may be defined by each partition. Often, however, the drive includes only one partition. Therefore, with only one partition, only one operating system may exist on the drive.

A master boot record (MBR) is included on the first sector of the hard drive within which is stored a partition table. The partition table describes the number of partitions for the disk as well as information about the size and location of each partition. The master boot record also includes a program that reads the active partition which contains the operating system to be booted into RAM. Although a hard disk may include many partitions, only one partition may be designated as the active partition.

When a computer system is booted, the operating system stored within the partition which is designated as the active partition is the operating system which is booted. Only one partition at a time may be designated as the active partition. Therefore, the master boot record will include an indication of each existing partition. The master boot record will also indicate which partition has been designated as the active partition.

Therefore a need exists for a data processing system and method including a hard disk drive partitioned to store a native operating system within an existing partition for creating a virtual partition within the existing partition, where a second operating system may be stored in the virtual partition.

SUMMARY OF THE INVENTION

A data processing system and method are described for creating a virtual partition within an existing partition within a hard disk drive included within the system. A first master boot record is written which includes a partition. The partition defines a first file system to be utilized by the hard drive. A file is created within the partition. The first master boot record is temporarily overwritten with a second master boot record without altering the first file system. The second master boot record includes a designation of the file as a second partition. The second partition defines a second file system. The second partition is designated as the active partition. The data processing system is booted utilizing the second master boot record. The second partition is a virtual partition within the existing partition.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–6 of the drawings, like numerals being used for like and corresponding parts of the accompanying drawings.

The present invention is a method and system for creating a virtual partition within an existing partition within a hard disk drive included within the system. A first master boot record is written which includes the existing partition. The existing partition defines a first, native, file system to be utilized by the hard drive. The native operating system for the computer system is stored in this partition. The existing partition is originally the active partition.

A file is then created within the existing partition. The file is defragmented so that all of the sectors within the file are contiguous. An offset is then determined from the starting location of the file to a cylinder boundary within the file. A virtual partition is then defined within the file from the offset. A second master boot record is then created which includes the virtual partition which starts at boundary.

The first master boot record is temporarily overwritten without altering the first file system with the second master boot record. The second master boot record includes a designation of the virtual partition as the active partition. The virtual partition defines a second file system. The original master boot record is stored for recovery purposes.

An operating system, different from the native operating system, which utilizes a file system which is different from the native file system may be stored in the file starting at the boundary. The data processing system is then booted utilizing the second master boot record. In this manner, the different operating system is booted from the new, virtual partition. Any desired tasks may be completed utilizing the different operating system. The original master boot record may then be restored, and the system rebooted utilizing the original master boot record, and thus the original, native operating system.

In this manner, a single partition is defined which includes two different types of file systems. A virtual partition defining one type of file system exists within the original existing partition which defines the native file system without altering the native file system of the original partition.

Figure 1:
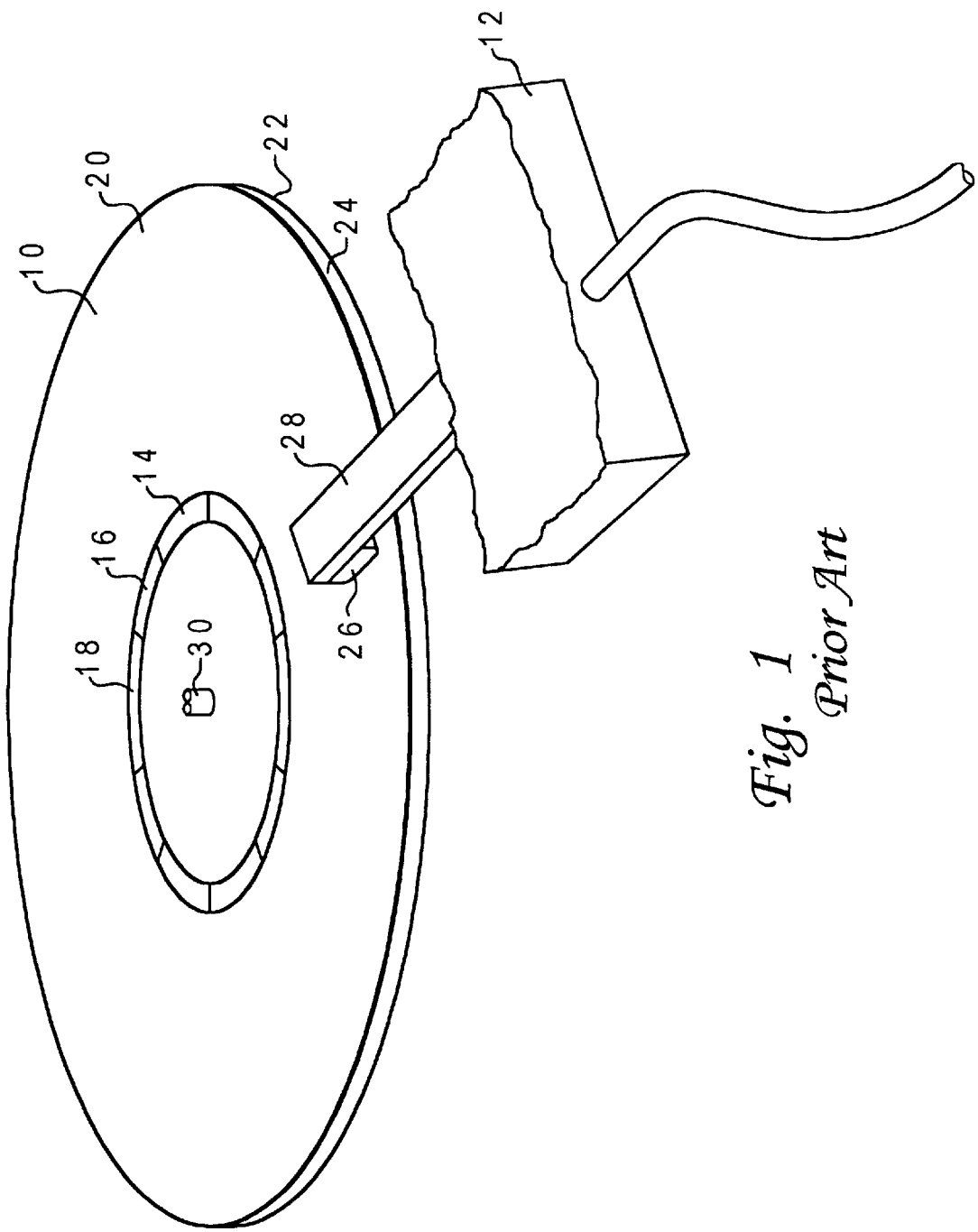
FIG. 1 depicts a disk drive and a disk in accordance with the prior art.
Figure 2:
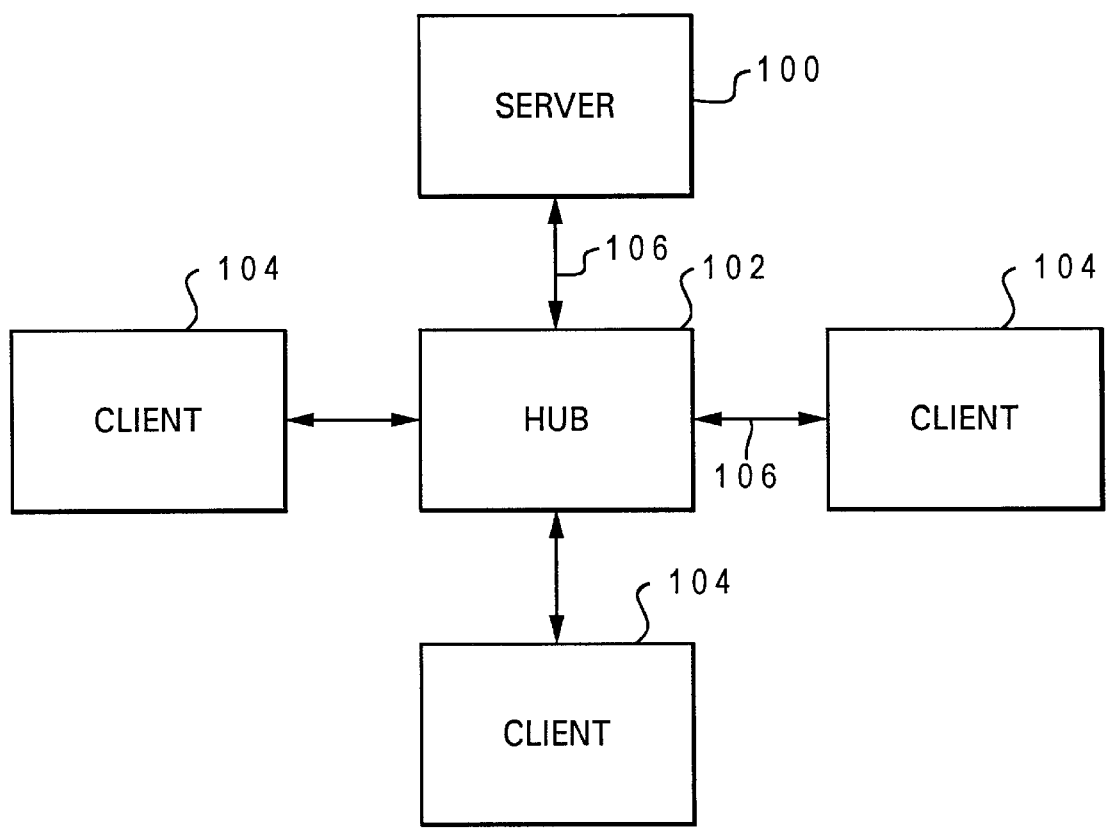
FIG. 2 illustrates a pictorial representation of a data processing system including a plurality of client computer systems coupled to a server computer system utilizing a network and a hub in accordance with the method and system of the present invention.

FIG. 2 illustrates a pictorial representation of a data processing system including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs. It will be appreciated, however, that other forms of networks, such as token ring, may be utilized to implement the invention.

A "network" may include any type of data communications channel, such as an Ethernet network, token ring, X.10, or X.25. Those skilled in the art will recognize that the invention described herein may be implemented utilizing any type of data communications channel. However, the preferred embodiment is implemented utilizing an Ethernet network.

Figure 3:
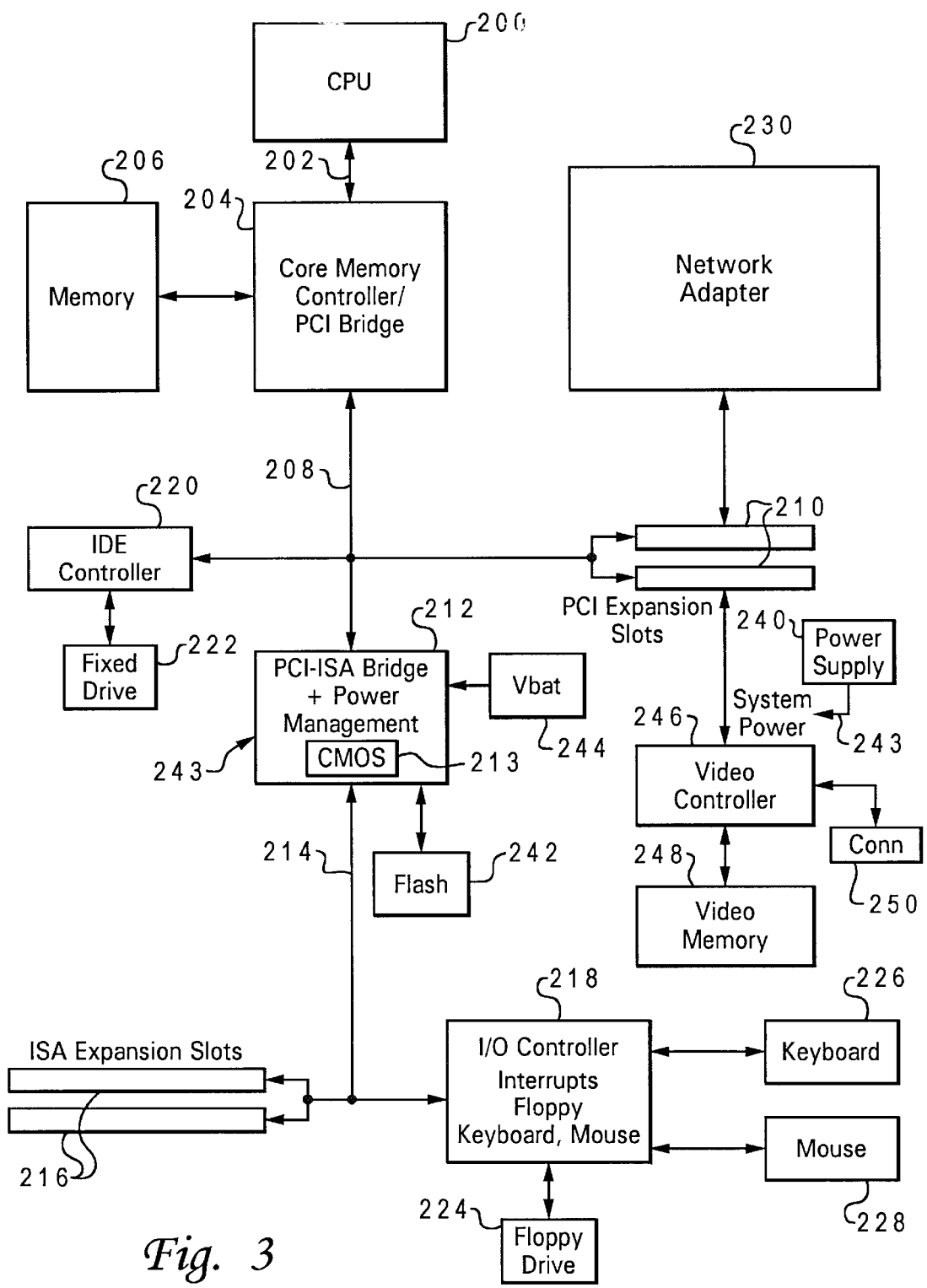
FIG. 3 depicts a more detailed pictorial representation of either a client computer system or server computer system of FIG. 2 in accordance with the method and system of the present invention.

FIG. 3 illustrates a more detailed pictorial representation of either a server or client computer system in accordance with the method and system of the present invention. A central processing unit (CPU) 200 is connected by address, control, and data busses 202 to a memory controller and peripheral component interconnect (PCI) bus bridge 204 which is also coupled to system memory 206. Core controller 204 includes memory status registers 245. Memory status registers 245 are utilized to maintain a single bit error counter, multiple bit error address, and an address of a single bit error. Memory status registers 245 are accessible utilizing CPU bus 202. Devices residing on PCI 208 may not typically access registers 245.

An integrated drive electronics (IDE) device controller 220 and a PCI bus to Industry Standard Architecture (ISA) bus bridge 212 are connected to PCI bus bridge 204 utilizing PCI bus 208. IDE controller 220 provides for the attachment of IDE compatible storage devices such as fixed disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

PCI-ISA bridge controller 212 includes an interface for a flash memory 242, which includes microcode which client 104 executes upon power-on. Flash memory 242 is an electrically erasable programmable read only memory (EEPROM) module and includes BIOS that is used to interface between the I/O devices and operating system. PCI-ISA bridge controller 212 also includes CMOS storage 213 that holds initialization settings which represent system configuration data. Storage 213 includes values which describe the present configuration of client 104. For example, storage 213 includes information describing the list of initial program load (IPL) devices set by a user and the sequence to be used for a particular power method, the type of display, the amount of memory, time date, etc. Furthermore, this data is stored in storage 213 whenever a special configuration program, such as configuration/setup is executed. PCI-ISA bridge controller 212 is supplied power from battery 244 to prevent loss of configuration data in storage 213.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200. I/O controller 218 also includes an IRQ register 219 for enabling/disabling of IRQ's, determining active IRQ's, and clearing IRQs.

Client system-104 includes a video controller 246 which may, for example, be plugged into one of connector slots 210. Video controller 246 is connected to video memory 248. The image in video memory 248 is read by controller 246 and displayed on a monitor (not shown) which is connected to client 104 through connector 250.

A client system 104 includes a network adapter 230 which may, for example, be plugged into one of the PCI connector slots 210 (as illustrated) or one of the ISA connector slots 216 in order to permit client 104 to communicate with a LAN via connector 236 to hub 102.

Client computer system 104 includes a special power supply 240 which supplies full normal system power 243, and has an auxiliary power main AUX 5 247 which supplies full time auxiliary power 247 to the power management logic 212 and to the network adapter 230. This enables client 104 to respond to a wakeup signal from network adapter 230. In response to a receipt of the wakeup signal, normal system power 243 from power supply 240 is turned on and then powers up client 104.

Figures 4, 5A, 5B, 5C:
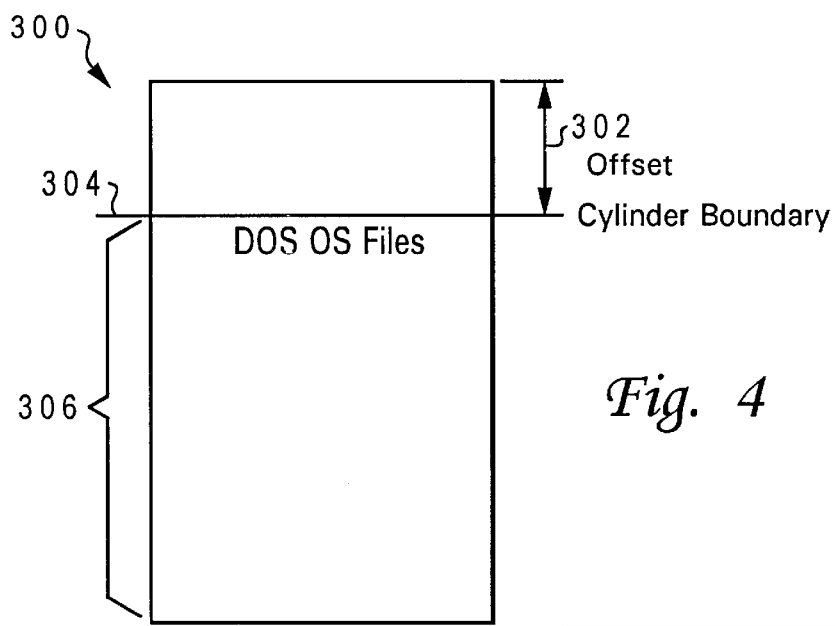
FIG. 4 illustrates a pictorial representation of a virtual partition included within an existing partition in accordance with the method and system of the present invention.
FIG. 5A depicts a pictorial representation of an original master boot record including only a single partition within a hard disk included in a computer system in accordance with the method and system of the present invention.
FIG. 5B depicts a pictorial representation of a first temporary master boot record including a virtual partition within a hard disk drive in a computer system in accordance with the method and system of the present invention.
FIG. 5C depicts a pictorial representation of a second temporary master boot record including a virtual partition within a hard disk drive in a computer system in accordance with the method and system of the present invention.

FIG. 4 illustrates a pictorial representation of a virtual partition included within an existing partition in accordance with the method and system of the present invention. A file 300 is depicted which has been created within hard disk drive 222. File 300 may be created anywhere within an existing partition in hard drive 222. File 300 is defragmented so that all of its sectors are contiguous. A cylinder boundary must be located within file 300. A cylinder boundary is defined as starting at sector 1, head 0 on a cylinder. An offset 302 is, thereafter, determined from a starting location of file 300 to the cylinder boundary 304.

A virtual partition 306 is created which starts at boundary 304. Within virtual partition 306, files for running an operating system other than the native operating system are stored. For example, files for running the DOS operating system may be stored in virtual partition 306.

FIG. 5A depicts a pictorial representation of an original master boot record including only a single, existing partition within a hard disk included in a computer system in accordance with the method and system of the present invention. Master boot record 400 includes a single partition. Therefore, hard disk drive 222 is partitioned into one partition. In the example depicted by FIG. 5A, master boot record 400 is partitioned into one partition for one operating system, such as a LINUX operating system. This partition is designated as the active partition.

A virtual partition is created within partition 404. File 300 is created anywhere within partition 404. File 300 is defragmented and a cylinder boundary is located within file 300. An offset 302 is, thereafter, determined from a top of file 300 to cylinder boundary 304. The virtual partition is then located in file 300 from boundary 304. The virtual partition 306 is thus created within partition 404. Files necessary for running an operating system, such as a DOS operating system, are stored within virtual partition 306 within partition 404.

Next, the original master boot record, as depicted by FIG. 5A, is stored for recovery purposes. Thereafter, a new master boot record must be created so that virtual partition 306 may be designated as the active partition. FIG. 5B depicts a first example of a master boot record within which the virtual partition may be designated as the active partition. Within the first example, the original, existing partition remains as a non-active partition while the virtual partition is designated as the active partition. FIG. 5C depicts a second example of a master boot record within which the virtual partition may be designated as the active partition. Within the second example, the indication of the original, existing partition has been removed. The virtual partition is the only partition within the master boot record and is designated as the active partition. Although the original partition has been removed from the master boot record, the original, partition and its file system have not been altered.

FIG. 5B depicts a pictorial representation of a first temporary master boot record including a virtual partition within a hard disk drive in a computer system in accordance with the method and system of the present invention. Temporary master boot record 402 includes a virtual partition 406 and a second partition 408. Virtual partition 406 is designated as the active partition. In this manner, a second operating system, such as the DOS operating system, may be installed and executed within the existing partition. The active partition is now the DOS partition which is the virtual partition. The original partition which included the LINUX operating system is now designated as a non-active partition. It is important to recognize that although two partitions are now depicted, the original LINUX partition exists on the hard disk unchanged. The DOS partition actually exists on the hard drive within the LINUX partition.

FIG. 5C depicts a pictorial representation of a second temporary master boot record including a virtual partition within a hard disk drive in a computer system in accordance with the method and system of the present invention. Temporary master boot record 410 includes a virtual partition 412. Virtual partition 412 is designated as the active partition. In this manner, a second operating system, such as the DOS operating system, may be installed and executed within the existing partition. This master boot record includes only one partition, the active partition which is the virtual partition. The active partition is now the DOS partition which is the virtual partition. The original partition which included the LINUX operating system is not designated within this master boot record. It is important to recognize that although the original LINUX partition is no longer included within this master boot record, the original LINUX partition exists on the hard disk unchanged. The DOS partition exists on the hard drive within the LINUX partition.

Figure 6:
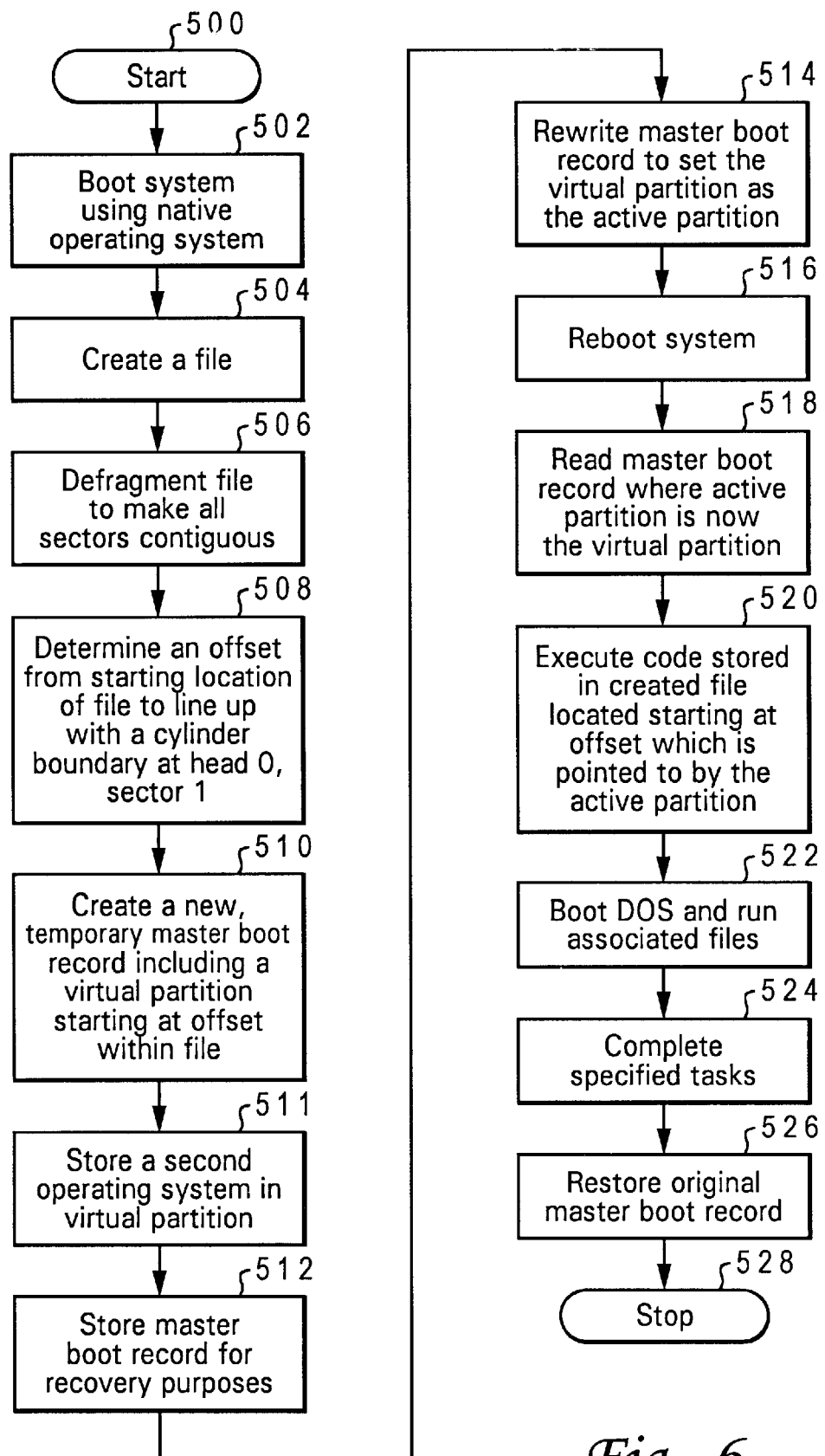
FIG. 6 illustrates a high level flow chart which depicts the creation of a virtual partition within an existing partition in accordance with the method and system of the present invention.

FIG. 6 depicts a high level flow chart which illustrates the creation of a virtual partition within an existing partition within a computer system in accordance with the method and system of the present invention. The process starts as depicted at block 500 and thereafter passes to block 502 which illustrates booting a computer system utilizing the native operating system already installed on the computer system. The hard disk included within the computer system has already been partitioned. Next, block 504 depicts the creation of a file on hard drive 222. Thereafter, block 506 illustrates defragmenting this new file to make all of the sectors where the file is stored contiguous.

The process then passes to block 508 which depicts a determination of an offset from the starting location of the file to a cylinder boundary. Next, block 510 illustrates the creation of a temporary master boot record which includes a DOS partition and all associated DOS files to boot DOS within the created file. The process then passes to block 511 which depicts the storage of a second operating system in the virtual partition. Thereafter, block 512 depicts storing the master boot record for recovery purposes. The process then passes to block 514 which illustrates rewriting the original master boot record with the temporary master boot record in order to set the virtual partition as the active partition. A virtual partition is, therefore, created located from the offset within file 300.

Block 516, then, depicts rebooting the system. The process then passes to block 518 which illustrates reading the master boot record where the active partition is now the virtual partition. Next, block 520 depicts executing the code stored within the created virtual partition. Thereafter, block 522 illustrates booting an operating system, such as DOS, included within the virtual partition. The files associated with the operating system are also executed. The process then passes to block 524 which depicts completing specified tasks. Thereafter, block 526 illustrates restoring the original master boot record. The process then terminates, as illustrated, by block 528.

While a preferred embodiment has been particularly shown and described, it will be understood by those skilled in the art that various changes in form and detail may be made therein without departing from the spirit and scope of the present invention.

What is claimed is:

1. A method in a data processing system including a hard disk drive for creating a virtual partition within an existing partition within said hard disk drive, said method comprising the steps of:
   writing a first master boot record including said existing partition, said existing partition defining a first file system to be utilized by said hard drive;
   creating a file within said existing partition;
   temporarily overwriting said first master boot record without altering said first file system with a second master boot record including a designation of said file as a second partition, said second partition defining a second file system;
   setting said second partition to be an active partition; and
   booting said data processing system utilizing said second master boot record, wherein said second partition is a virtual partition within said existing partition.

2. The method according to claim 1, further comprising the step of creating said file within said existing partition starting at a cylinder boundary within said hard disk.

3. The method according to claim 1, further comprising the step of defragmenting said file to make all sectors designated to store said file contiguous.

4. The method according to claim 1, further comprising the step of determining an offset from a starting location of said file to a cylinder boundary, wherein said virtual partition is located starting at said offset.

5. The method according to claim 1, further comprising the step of storing said first master boot record for recovery purposes prior to the step of temporarily overwriting said first master boot record with said second master boot record.

6. The method according to claim 5, wherein the step of temporarily overwriting said first master boot record with a second master boot record including a designation of said file as a second partition further comprises the step of temporarily overwriting said first master boot record with a second master boot record including a designation of said file having a starting location of said offset as a second partition, and a designation of said second partition as said active partition.

7. The method according to claim 6, wherein the step of writing a first master boot record including said existing partition, said existing partition defining a first file system to be utilized by said hard drive further comprises the step of writing a first master boot record including said existing partition, said existing partition defining a first file system to be utilized by said hard drive for booting a first operating system.

8. The method according to claim 7, wherein the step of booting said data processing system utilizing said second master boot record further comprises the step of booting said data processing system utilizing said second partition defining a second file system to be utilized by said hard drive for booting a second operating system which is stored in said second partition.

9. The method according to claim 8, further comprising the step of after said step of booting said data processing system utilizing said second master boot record, executing a task utilizing said second operating system.

10. The method according to claim 9, further comprising the steps of:
    after said step of executing a task, restoring said first master boot record; and
    booting said data processing system utilizing said first master boot record.

11. A data processing system including a hard disk drive for creating a virtual partition within an existing partition within said hard disk drive, said data processing system including a CPU, comprising:
    said CPU executing code for writing a first master boot record including said existing partition, said existing partition defining a first file system to be utilized by said hard drive;
    said CPU executing code for creating a file within said existing partition;
    said CPU executing code for temporarily overwriting said first master boot record without altering said first file system with a second master boot record including a designation of said file as a second partition, said second partition defining a second file system;
    said CPU executing code for setting said second partition to be an active partition; and
    said CPU executing code for booting said data processing system utilizing said second master boot record, wherein said second partition is a virtual partition within said existing partition.

12. The system according to claim 11, further comprising said CPU executing code for creating said file within said existing partition starting at a cylinder boundary within said hard disk.

13. The system according to claim 11, further comprising said CPU executing code for defragmenting said file to make all sectors designated to store said file contiguous.

14. The system according to claim 11, further comprising said CPU executing code for determining an offset from a starting location of said file to a cylinder boundary, wherein said virtual partition is located starting at said offset.

15. The system according to claim 11, further comprising said CPU executing code for storing said first master boot record for recovery purposes prior to said CPU executing code for temporarily overwriting said first master boot record with said second master boot record.

16. The system according to claim 15, wherein said CPU executing code for temporarily overwriting said first master boot record with a second master boot record including a designation of said file as a second partition further comprises said CPU executing code for temporarily overwriting said first master boot record with a second master boot record including a designation of said file having a starting location of said offset as a second partition, and a designation of said second partition as said active partition.

17. The system according to claim 16, wherein said CPU executing code for writing a first master boot record including said existing partition, said existing partition defining a first file system to be utilized by said hard drive further comprises said CPU executing code for writing a first master boot record including said existing partition, said existing partition defining a first file system to be utilized by said hard drive for booting a first operating system.

18. The system according to claim 17, wherein said CPU executing code for booting said data processing system utilizing said second master boot record further comprises said CPU executing code for booting said data processing system utilizing said second partition defining a second file system to be utilized by said hard drive for booting a second operating system which is stored in said second partition.

19. The system according to claim 18, further comprising after said CPU executing code for booting said data processing system utilizing said second master boot record, said CPU executing code for executing a task utilizing said second operating system.

20. The system according to claim 19, further comprising:
   after said CPU executing code for executing a task, said CPU executing code for restoring said first master boot record; and
   said CPU executing code for booting said data processing system utilizing said first master boot record.

21. A data processing system including a hard disk drive for creating a virtual partition within an existing partition within said hard disk drive, said data processing system including a CPU, comprising:
   said CPU executing code for writing a first master boot record including said existing partition, said existing partition defining a first file system to be utilized to boot a first operating system;
   said CPU executing code for creating a file within said existing partition starting at a cylinder boundary within said hard disk;
   said CPU executing code for defragmenting said file to make all sectors designated to store said file contiguous;
   said CPU executing code for determining an offset from a starting location of said file to a cylinder boundary, wherein said virtual partition is located starting at said offset;
   said CPU executing code for storing said first master boot record for recovery purposes;
   said CPU executing code for temporarily overwriting said first master boot record without altering said first file system with a second master boot record including a designation of said file as a second partition, said second partition defining a second file system for booting a second operating system which is stored in said second partition, said second partition including a designation of said file having a starting location of said offset as a second partition and a designation of said second partition as said active partition;
   said CPU executing code for setting said second partition to be an active partition;
   said CPU executing code for booting said data processing system utilizing said second master boot record, wherein said second partition is a virtual partition within said existing partition;
   said CPU executing code for executing a task utilizing said second operating system;
   said CPU executing code for restoring said first master boot record; and
   said CPU executing code for booting said data processing system utilizing said first master boot record.

* * * * *